United States Patent
Murakami

(10) Patent No.: US 7,800,798 B2
(45) Date of Patent: Sep. 21, 2010

(54) PRINT QUALITY MEASURING METHOD AND PRINT QUALITY MEASURING APPARATUS

(75) Inventor: Shigeo Murakami, Kyoto (JP)

(73) Assignee: Dainnippon Screen Mfg. Co., Ltd., Kyoto (JP)

(*) Notice: Subject to any disclaimer, the term of this patent is extended or adjusted under 35 U.S.C. 154(b) by 2193 days.

(21) Appl. No.: 10/615,294

(22) Filed: Jul. 9, 2003

(65) Prior Publication Data

US 2004/0012801 A1    Jan. 22, 2004

(30) Foreign Application Priority Data

Jul. 19, 2002 (JP) .............................. 2002-210872

(51) Int. Cl.
*H04N 1/46* (2006.01)
(52) U.S. Cl. .................. 358/504; 358/1.9; 358/505; 358/518; 358/522
(58) Field of Classification Search .................. 358/2.1, 358/3.01, 3.02, 3.1, 518, 522, 1.9, 1.15, 504, 358/505; 382/164, 165, 167, 168, 171, 172, 382/175, 176, 180
See application file for complete search history.

(56) References Cited

U.S. PATENT DOCUMENTS

| | | | | |
|---|---|---|---|---|
| 4,233,663 A | * | 11/1980 | Sugawara et al. | 358/296 |
| 4,649,502 A | * | 3/1987 | Keller et al. | 358/1.9 |
| 5,309,228 A | * | 5/1994 | Nakamura | 358/500 |
| 5,450,165 A | | 9/1995 | Henderson | |
| 5,461,457 A | * | 10/1995 | Nakamura | 355/77 |

(Continued)

FOREIGN PATENT DOCUMENTS

EP    0 142 470 A1    5/1985

(Continued)

OTHER PUBLICATIONS

Japanese Office Action, issued in Japanese Patent Application No. JP 2002-210872 dated on Feb. 10, 2009.

(Continued)

*Primary Examiner*—Edward L Coles
*Assistant Examiner*—Vu B Hang
(74) *Attorney, Agent, or Firm*—McDermott Will & Emery LLP

(57) ABSTRACT

A representative color determining step is executed to determine, from image data, a representative color characterizing an image of a print, and positions of the representative color. A gray control color determining step is executed to determine, from the image data, a gray control color expressed in an achromatic color and positions of the gray control color. A reading step is executed to read an image of reference paper and an image of an actual print. Then, a calculating step is executed to carry out a comparative calculation of color data in the positions of the representative color of the image of the reference paper and color data in the positions of the representative color of the image of the print, and a comparative calculation of color data in the positions of the gray control color of the image of the reference paper and color data in the positions of the gray control color of the image of the print, to create control data for controlling ink feeding rates of a printing machine.

14 Claims, 9 Drawing Sheets

U.S. PATENT DOCUMENTS

| | | | |
|---|---|---|---|
| 5,724,437 A | 3/1998 | Bucher et al. | |
| 5,731,989 A | 3/1998 | Tenny et al. | |
| 5,774,635 A | 6/1998 | Kuusisto et al. | |
| 6,204,873 B1 * | 3/2001 | Shimazaki | 347/172 |
| 6,211,973 B1 * | 4/2001 | Takemoto | 358/515 |
| 6,382,101 B1 | 5/2002 | Richards | |
| 6,775,408 B1 * | 8/2004 | Masaki | 382/167 |
| 6,873,731 B2 * | 3/2005 | Takakura et al. | 382/172 |
| 2001/0010191 A1 | 8/2001 | Steinbacher | |

FOREIGN PATENT DOCUMENTS

| | | |
|---|---|---|
| EP | 0 803 356 A2 | 10/1997 |
| JP | 4-303660 | 10/1992 |
| JP | 8-261829 | 10/1996 |
| JP | 9-193361 | 7/1997 |
| JP | 10-35074 | 2/1998 |
| JP | 10-305562 | 11/1998 |
| JP | 11-320838 | 11/1999 |
| JP | P2001-353852 A | 12/2001 |

OTHER PUBLICATIONS

European Search Report issued in corresponding European Patent Application No. 03015450.4-1228, dated Jan. 30, 2007.

* cited by examiner (a)

data of reference paper

| section No. | type of color | CMYK values(%) | RGB values |
|---|---|---|---|
| 1 | representative color | 60,40,20,0 | 70,100,150 |
| 1 | gray control color | 40,30,30,0 | 120,110,120 |
| 1 | Bk control color | _____ | _____ |
| 2 | representative color | 62,40,23,0 | 68,100,145 |
| 2 | gray control color | 42,35,35,0 | 115,105,113 |
| 2 | Bk control color | 50,30,40,90 | 20,25,20 |
| 3 | . | . | . |
| 3 | . | . | . |
| 3 | . | . | . |

(b)

data of print

| section No. | type of color | CMYK values(%) | RGB values |
|---|---|---|---|
| 1 | representative color | 60,40,20,0 | 70,97,145 |
| 1 | gray control color | 40,30,30,0 | 120,116,114 |
| 1 | Bk control color | _____ | _____ |
| 2 | representative color | 62,40,23,0 | 66,95,141 |
| 2 | gray control color | 42,35,35,0 | 113,100,106 |
| 2 | Bk control color | 50,30,40,90 | 25,19,10 |
| 3 | . | . | . |
| 3 | . | . | . |
| 3 | . | . | . |

PRINT QUALITY MEASURING METHOD AND PRINT QUALITY MEASURING APPARATUS

BACKGROUND OF THE INVENTION

1. Field of the Invention

This invention relates to print quality measuring methods and print quality measuring apparatus.

2. Description of the Related Art

In order to perform proper printing with a printing machine, it is necessary to control ink feeding rates properly. For controlling the ink feeding rates, it has been conventional practice to measure densities of control strips with a densitometer and determine from density data whether the ink feeding rates are proper or not. However, the density data from the control strips alone is not necessarily sufficient for attaining a proper color tone and the like for a picture area.

For this reason, a print quality measuring apparatus is used which provides control data for controlling the ink feeding rates of a printing machine. The control data is produced by comparing an image on reference paper and an image on an actual print.

The reference paper is also called proof paper, and serves as a reference indicating a color tone of finished prints to obtain proper prints. Printing paper actually printed is also called sampling paper which is extracted by the operator from a discharge station of a printing machine at certain intervals during a printing operation. The printing is considered proper when the color tone on the sampling paper substantially coincides with the color tone on the reference paper.

Where a print quality measuring apparatus is used for comparing an image on the reference paper and image on the actual print to produce control data for controlling the ink feeding rates of a printing machine, it is difficult to attain an agreement in color tone and the like in all areas between the image on the reference paper and image on the actual print. For this reason, only certain areas of these images are compared. Such areas selected for comparison do not always assure a proper color tone and the like for areas characterizing the picture.

SUMMARY OF THE INVENTION

The object of this invention, therefore, is to provide a print quality measuring method and a print quality measuring apparatus for forming proper images in areas characterizing a picture, thereby obtaining proper prints from a printing machine.

The above object is fulfilled, according to this invention, by a print quality measuring method for comparing an image of reference paper and an image of an actual print to create control data for controlling ink feeding rates of a printing machine, the method comprising a reading step for reading the image of the reference paper and the image of the actual print; a representative color determining step for determining, from image data, a representative color characterizing the image of the print, and positions of the representative color; and a calculating step for carrying out a comparative calculation of color data in the positions of the representative color of the image of the reference paper and color data in the positions of the representative color of the image of the print, to create the control data for controlling the ink feeding rates of the printing machine.

With this print quality measuring method, proper images may be formed in areas characterizing a picture, thereby obtaining proper prints from a printing machine.

In a preferred embodiment of the invention, the representative color and the positions thereof are determined for respective sections corresponding to ink keys in each ink well of the printing machine.

Preferably, the image data has three color components, the representative color determining step being executed to classify pixels in each of the sections corresponding to ink keys, and determine the representative color and a position thereof from pixels included in a predetermined class interval.

The representative color determining step may be executed to create a histogram with tones of each of the three color components of each pixel in each of the sections, and select the representative color and the position thereof from pixels included in a class interval of maximum frequency in the histogram.

In another embodiment, the print quality measuring method further comprises a gray control color determining step for determining, from the image data, a gray control color expressed in a substantially achromatic color and positions of the gray control color; wherein the operating step is executed to create the control data for controlling the ink feeding rates of the printing machine, by using results of a comparative calculation of color data in the positions of the gray control color of the image of the reference paper and color data in the positions of the gray control color of the image of the print, as well as results of the comparative calculation of the color data in the positions of the representative color of the image of the reference paper and the color data in the positions of the representative color of the image of the print.

Preferably, only the results of the comparative calculation of the color data in the positions of the gray control color of the image of the reference paper and the color data in the positions of the gray control color of the image of the print are used when the representative color is devoid of one of the three color components.

In another aspect of the invention, a print quality measuring method is provided for comparing image data obtained by reading an image of an actual print with one of platemaking data used at platemaking time and image data created from the platemaking data, to create control data for controlling ink feeding rates of a printing machine, the method comprising a reading step for reading the image of the actual print; a representative color determining step for determining a representative color characterizing the image of the print, and positions of the representative color, based on one of the platemaking data used at platemaking time and the image data created from the platemaking data; and a calculating step for carrying out a comparative calculation of color data in the positions of the representative color of the image of the print and the representative color, to create the control data for controlling the ink feeding rates of the printing machine.

In a further aspect of the invention, a print quality measuring apparatus is provided for comparing an image of reference paper and an image of an actual print to create control data for controlling ink feeding rates of a printing machine, the apparatus comprising a reading unit for reading the image of the reference paper and the image of the actual print; a representative color determining unit for determining, from image data, a representative color characterizing the image of the print, and positions of the representative color; and a calculating unit for carrying out a comparative calculation of color data in the positions of the representative color of the image of the reference paper and color data in the positions of the representative color of the image of the print, to create the control data for controlling the ink feeding rates of the printing machine.

Other features and advantages of the invention will be apparent from the following detailed description of the embodiments of the invention.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

FIG. 9 is a view showing data stored in a first and a second image memories.

DESCRIPTION OF THE PREFERRED EMBODIMENTS

Figure 1:
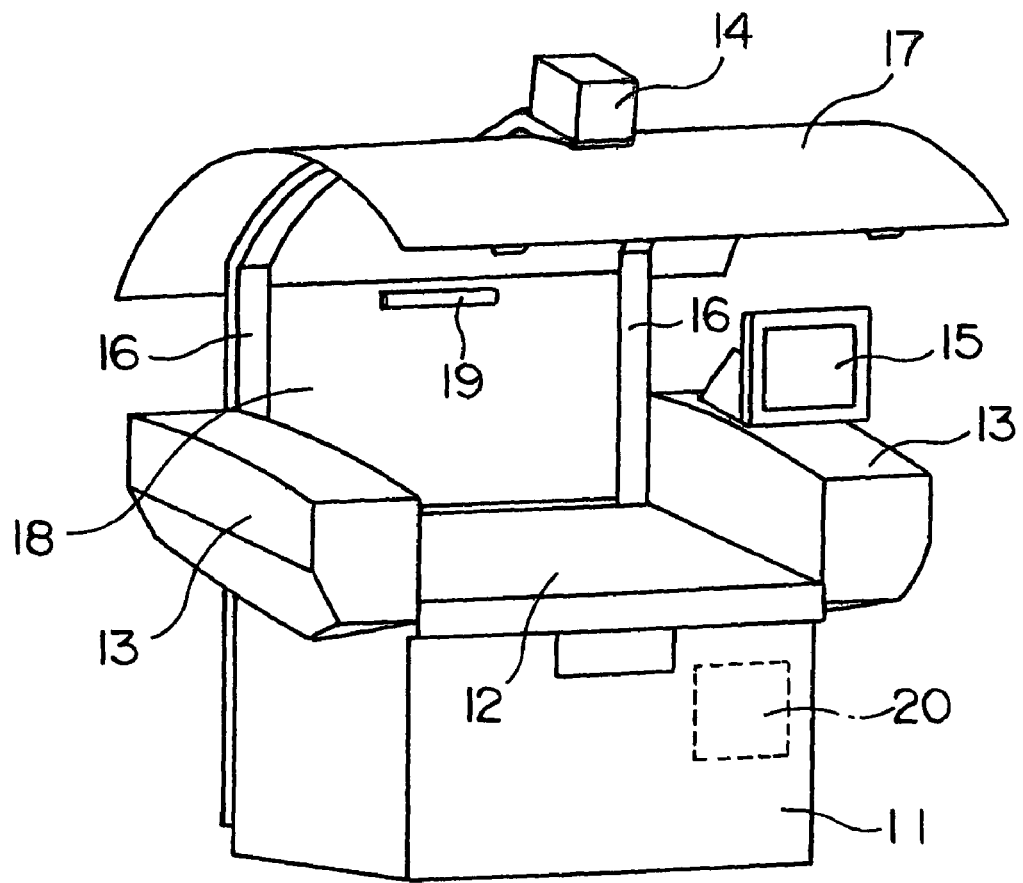
FIG. 1 is a perspective view of a print quality measuring apparatus according to this invention.
Figure 2:
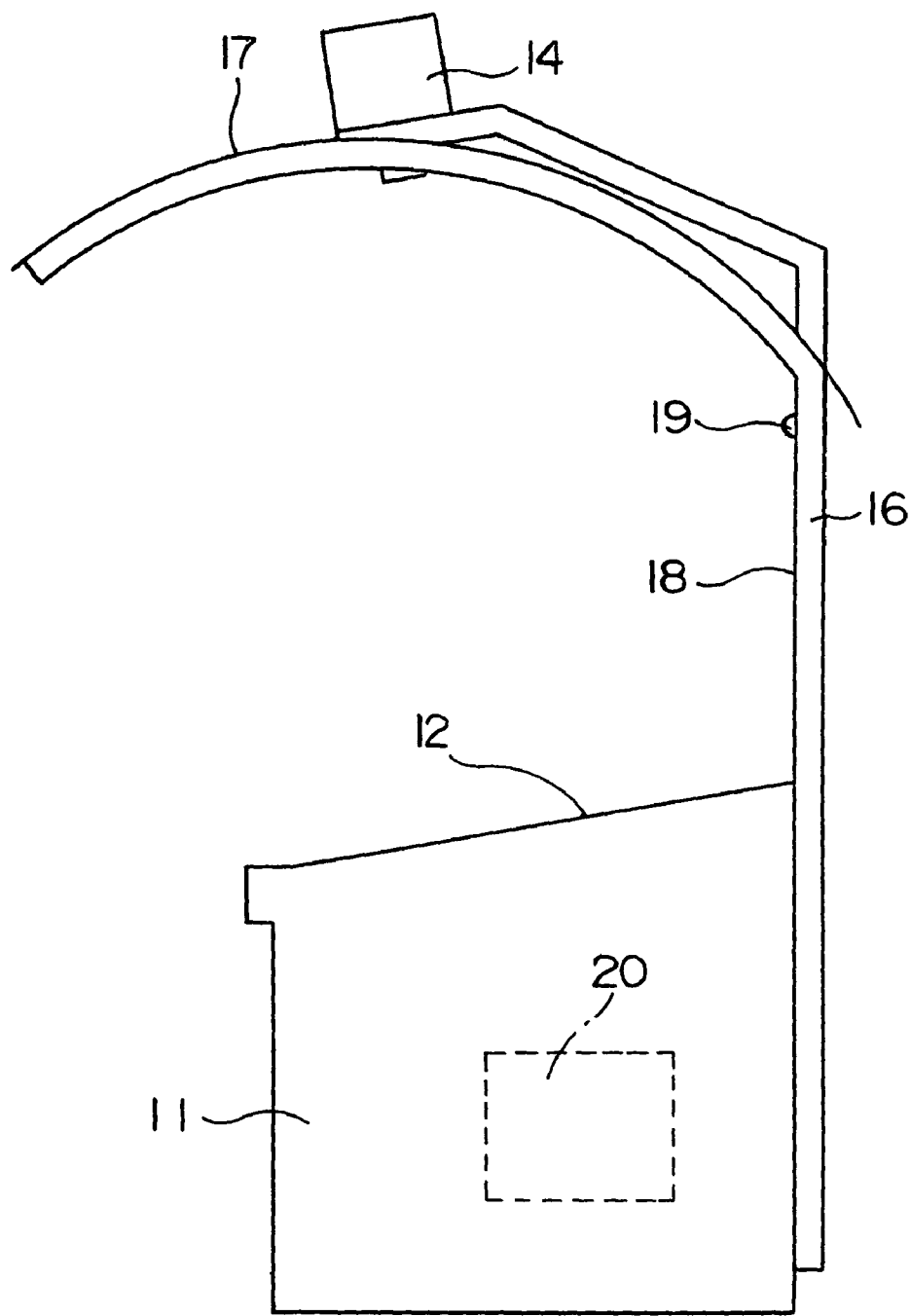
FIG. 2 is a side view of the print quality measuring apparatus.

An embodiment of this invention will be described hereinafter with reference to the drawings. FIG. 1 is a perspective view of a print quality measuring apparatus according to the invention. FIG. 2 is a side view of the apparatus. It is to be noted that light sources 13 and a control panel 15 are omitted from FIG. 2.

This print quality measuring apparatus includes a table 12 disposed above a frame 11, a pair of light sources 13 arranged at right and left sides of the table 12, an image pickup unit 14 disposed above the table 12, a control panel 15 disposed above one of the light sources 13, an upper light-shielding plate 17 and a rear light-shielding plate 18 supported by a pair of posts 16, an auxiliary light source 19 attached to the rear light-shielding plate 18, and a control unit 20 mounted inside the frame 11 for controlling the entire apparatus.

The table 12 is shaped planar for receiving a print thereon. The table 12 has a surface in the form of a suction plate for holding the print by static electricity or vacuum suction. The surface of the table 12 is inclined about 10 degrees for facility of operation by the operator. The print held by suction on the inclined surface of the table 12 is illuminated by the pair of light sources 13 arranged at the opposite sides.

The image pickup unit 14 disposed above the table 12 has a digital camera for separating, with a dichroic mirror, light emitted from the light sources 13 and reflected from the surface of the print into the three primary color components of RGB, and receiving the individual components with separate CCD arrays. With this image pickup unit 14, RGB data can be obtained from the print.

The control panel 15 is the touch panel type in the form of an LCD monitor having a pressure sensitive input function (also called a touch sensitive screen). This control panel 15 acts as both a display device and an input device, and is connected to the control unit 20 described hereinafter.

Figure 3:
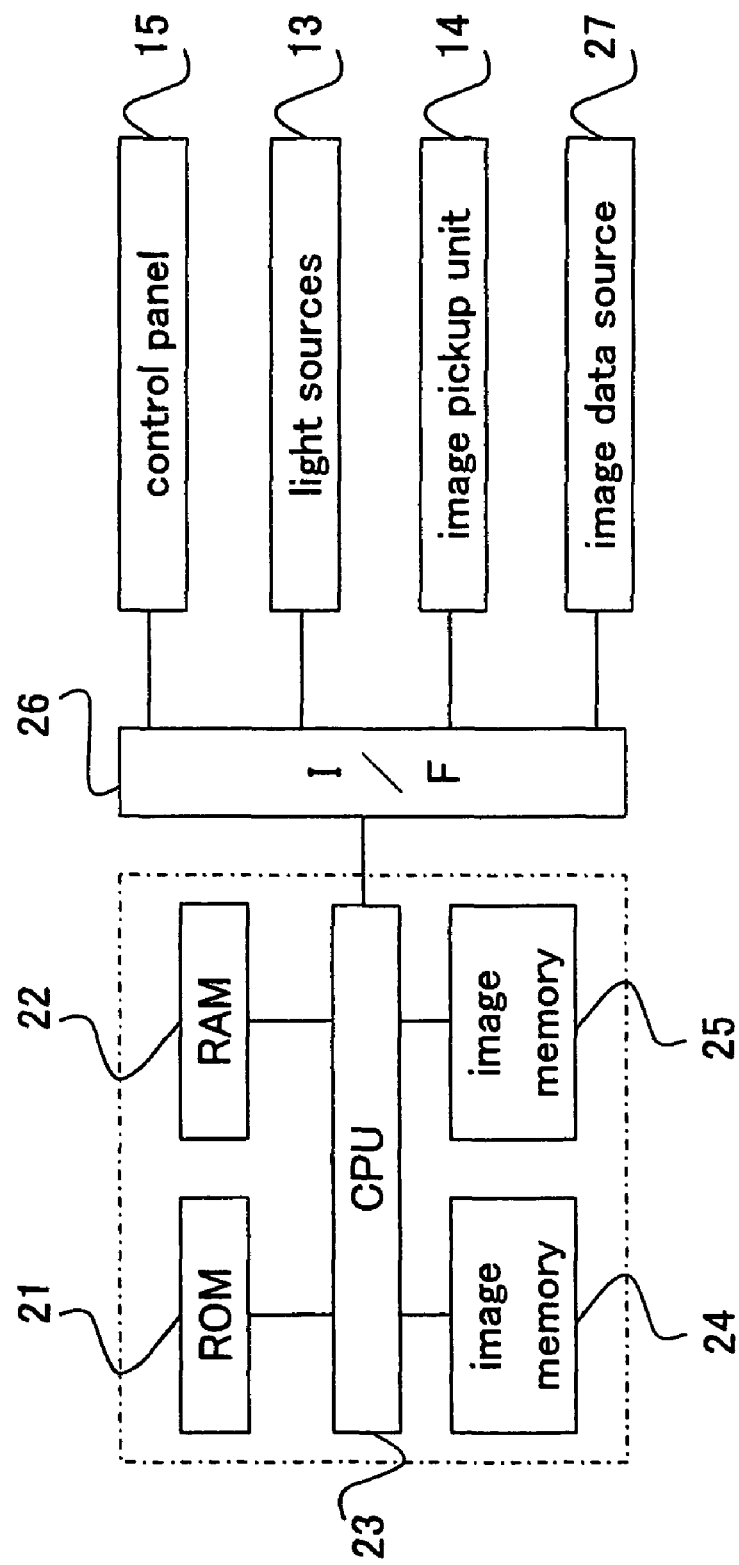
FIG. 3 is a block diagram showing a principal structure of a control unit.

FIG. 3 is a block diagram showing a principal structure of the control unit 20.

This control unit 20 includes a ROM 21 for storing operating programs necessary for controlling the apparatus, a RAM 22 for temporarily storing data and the like during a control operation, a CPU 23 for performing logic operations, and a first and a second image memories 24 and 25. The control unit 20 is connected through an interface 26 to the control panel 15, light sources 13 and image pickup unit 14 noted above. The control unit 20 is connected also to an image data source 27 storing image data to be printed, such as a hard disk or an image processing device. This control unit 20 acts as the representative color determining device, gray control color determining device and calculating device of this invention.

Referring again to FIGS. 1 and 2, the upper light-shielding plate 17 supported by the pair of posts 16 has a curved configuration extending in the fore and aft direction of the print quality measuring apparatus. The light-shielding plate 17 is installed in order to intercept light, such as light from indoor light sources, that would constitute a regular reflection from the table 12. On the other hand, the rear light-shielding plate 18 supported between the pair of posts 16 serves to intercept light coming from behind the print quality measuring apparatus.

The auxiliary light source 19 attached to the rear light-shielding plate 18 serves to compensate for a lack of light on the table 12 caused by the upper light-shielding plate 17 and rear light-shielding plate 18. The auxiliary light source 19 is in the form of a fluorescent light or the like, which is turned off when reading a print with the image pickup unit 14.

In the print quality measuring apparatus having the above construction, a representative color determining and other steps described in detail hereinafter are first executed by using image data stored in the image data source 27 of an image to be printed.

Next, reading steps are executed to read an image of reference paper and an image actually printed. Specifically, reference paper is first placed on the table 12 and held thereon by suction. The reference paper is illuminated by the light sources 13, and the image of the reference paper is read by the image pickup unit 14. Data of the image of the reference paper is stored in the first image memory 24 of the control unit 20. Next, a print extracted by the operator from a discharge station of a printing machine during a printing operation is placed on the table 12, and held thereon by suction. This print is illuminated by the light sources 13, and the image of the print is read by the image pickup unit 14. Data of the image of the print is stored in the second image memory 25 of the control unit 20.

Then, a calculating step to be described in detail hereinafter is executed to create control data for controlling ink feeding rates of the printing machine. This control data is transmitted on-line or off-line through the interface 26 to the printing machine not shown.

Figure 4:
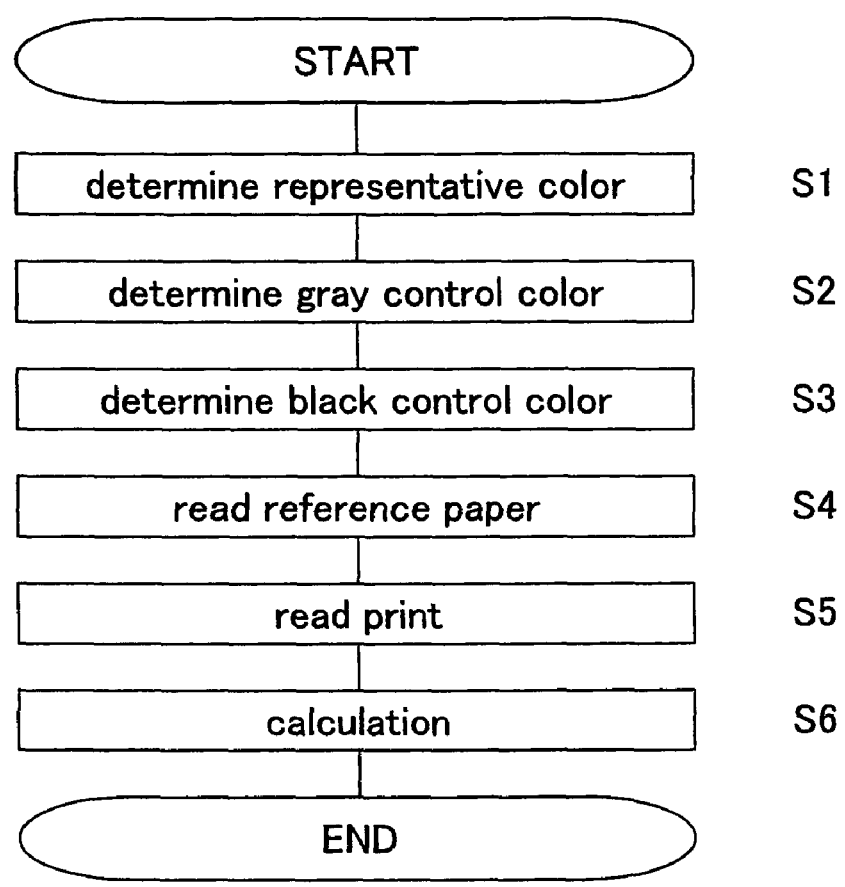
FIG. 4 is a flow chart of a print quality measuring operation.

Each step of the above print quality measuring operation will be described next. FIG. 4 is a flow chart of the print quality measuring operation.

When a print is measured in order to create the control data for controlling the ink feeding rates of the printing machine, a representative color characterizing the image to be printed and positions of this color are first determined based on the data of the image (step S1). This representative color determining step is executed by a subroutine shown in FIG. 5.

First, the image data of the image to be printed is fetched from the image data source 27 (step S11). This image data is platemaking data of CMYK (cyan, magenta, yellow and black) for an image printed when making printing plates, or image data created from this platemaking data. This image data is supplied as PPF (Print Production Format) data, for example, according to the CIP3 (international Cooperation for Integration of Prepress, Press and Postpress) standards. In this specification, black is referred to as K or Bk as appropriate.

Next, this PPF data (CMYK data) is converted to data with RGB tones (step S12). Considering that the CMYK data has 0 to 255 eight-bit values, the conversion is performed by the formulas (1)-(3) set out below. Negative RGB values are regarded as zero.

$$R=255-(C+K) \quad (1)$$

$$G=255-(M+K) \quad (2)$$

$$B=255-(Y+K) \quad (3)$$

Next, edge components are extracted and removed from the RGB image (step S13). That is, when an edge amount which is a sum of differences (absolute values) between a given pixel and pixels adjacent thereto in the four directions exceeds a fixed value, this given pixel is regarded as an edge pixel. Such edge pixels are excluded from the subsequent process.

The RGB image is divided into sections corresponding to ink keys in each ink well of the printing machine (step S14). The subsequent steps (step S15 et seq.) are executed for each divided section.

First, pixels with heavy contributions of Bk (black) ink are extracted and removed (step S15). That is, of the data of CMYK before conversion to RGB, pixels with a minimum value of CMY smaller than the value of K are regarded as pixels with heavy contributions of Bk, and are excluded from the subsequent process.

Next, a three-dimensional histogram is created with the RGB values of the remaining pixels (step S16). Specifically, a three-dimensional region is appropriately divided for every color component of RGB to form equally divided cubes with one side including a predetermined tonal range, and then a frequency distribution is determined for respective class intervals. A process of creating this three-dimensional histogram is described in detail in Japanese Unexamined Patent Publication No. 11-296672 (1999) in the name of Assignee herein.

In this embodiment, the histogram is created with the RGB values. Instead, a frequency distribution may be created with three components of a different color system, such as CMY values.

Next, a color expressed by the intervals of the histogram is weighted by multiplying the frequency by an appropriate factor (step S17). When it is desired to give priority to flesh color in the picture as representative color, its color gamut is multiplied by a large factor. An interval having a maximum frequency after the multiplication by the factor is determined to be the color gamut serving as representative color, and only the pixels included in this interval are considered in the subsequent process.

In the above description, a histogram is created to determine a color gamut serving as representative color. Alternatively, the operator may designate a predetermined color gamut in place of the interval having the maximum frequency. In this case, the calculation of frequencies is unnecessary.

Next, isolated points are removed from the pixels included in the interval of maximum frequency resulting from the multiplication (step S18). That is, outermost pixels of the areas formed by the pixels included in the interval of maximum frequency resulting from the multiplication are removed as isolated points. This operation is repeated until the total number of pixels in all areas becomes 1 or 0 (step S19).

When the number of remaining pixels is 1, the CMYK values of this pixel is regarded as forming the representative color, and the position of the pixel is regarded as the position of the representative color. When the number of remaining pixels is 0, the CMYK values of one of the pixels that remained to the last, e.g. a pixel near the center of the sections corresponding to the ink keys, are regarded as forming the representative color, and the position of this pixel is regarded as the position of the representative color. In this way, a representative color and its position are determined (step S20).

The position of maximum area formed by the pixels (area of a series of pixels) included in the interval of maximum frequency after the removal of isolated points is selected to be the position of representative color as noted above. This is done to avoid the influence of errors caused by the intrinsic noise of the image pickup unit 14, and the influence of alignment errors occurring when comparing color data of a position of a representative color of the image on the reference paper described hereinafter and color data of the position of the representative color of a printed image.

In the above embodiment, one pixel remaining after the removal of isolated points is regarded as the pixel corresponding to the representative color, and the CMYK values of this pixel are regarded as forming the representative color. The representative color may be obtained from an average or weighted average of the CMYK values of that pixel and a number of adjacent pixels. This measure is effective for lessening the influence of noise included in pixels.

Referring again to FIG. 4, a gray control color expressed in a substantially achromatic color and its position are determined next (step S2).

Figure 5:
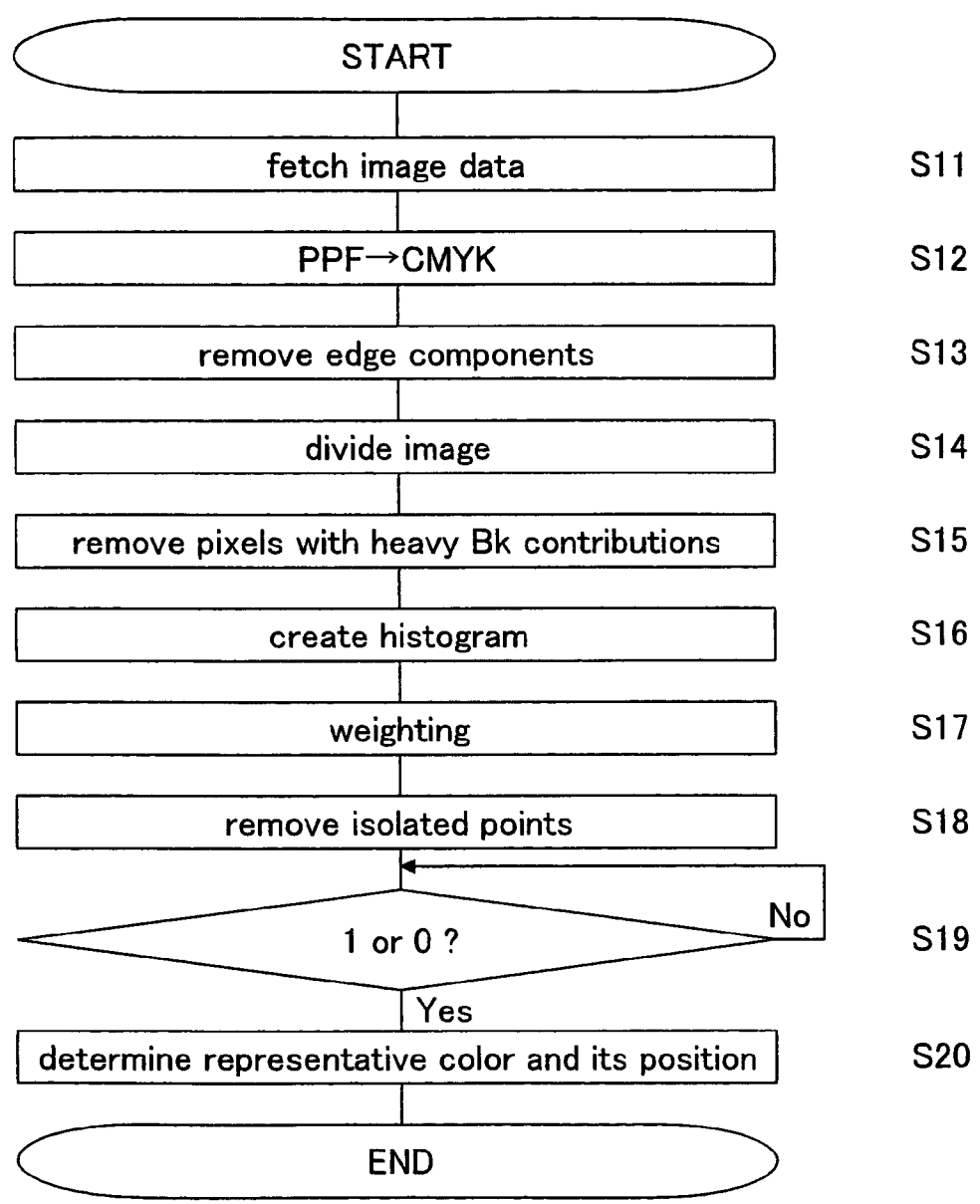
FIG. 5 is a representative color determining operation.

This gray control color determining step is executed by a sequence similar to that of the representative color determining step shown in FIG. 5. However, in the gray control color determining step, step S17 in FIG. 5 is executed to multiply the intervals of the histogram corresponding to gray by a factor of 1 or more, so that a gray portion is selected with priority in step S18. Of course, a predetermined color gamut may be designated directly as an interval presenting the gray control color. When the selected gray region fails to have a fixed area, that is when the number of repetitions made in step S19 does not reach a fixed number, the section corresponding to one of the ink keys are regarded as being smaller than a predetermined gray area, and no gray control color is determined.

Next, a Bk control color expressed in black and its positions are determined (step S3).

This Bk control color determining step is executed by a sequence similar to that of the representative color determining step shown in FIG. 5. However, in the gray control color determining step, step S15 in FIG. 5 is executed to extract and remove pixels with minor contributions of Bk (black) ink. That is, of the CMYK data, the pixels with a maximum value of CMY larger than the value of K are regarded as pixels with minor contributions of Bk, and are excluded from the subsequent process. When the selected Bk region fails to have a fixed area, that is when the number of repetitions made in step S19 does not reach a fixed number, the section corresponding to one of the ink keys are regarded as being smaller than a predetermined Bk area, and no Bk control color is determined.

Figure 6:
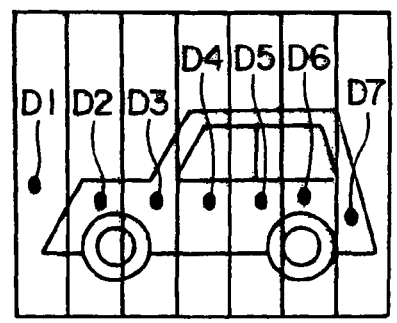
FIG. 6 is an explanatory view showing positions of a representative color, a gray control color and a black control color.
Figure 6:
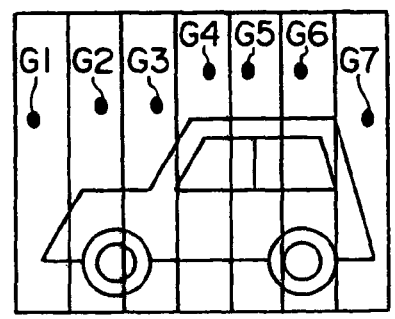
Figure 6:
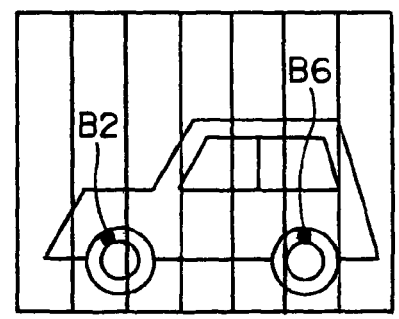
Figure 6:
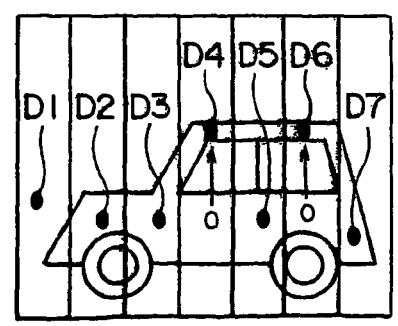

FIG. 6 shows explanatory views showing positions of the representative color, gray control color and Bk control color. In FIG. 6 (a), D1-D7 denote positions of the representative color determined in the representative color determining step (step S1). In FIG. 6 (b), G1-G7 denote positions of the gray control color determined in the gray control color determining step (step S2). In FIG. 6 (c), B2 and B6 denote positions of the Bk control color obtained in the Bk color determining step (step S3).

The positions of the representative color, gray control color and Bk control color are displayed, along with the image to be printed, on the control panel 15 shown in FIG. 1. The operator may confirm the positions of the gray control color and Bk control color displayed on the control panel 15, and may, as necessary, change the positions of the representative color as shown in FIG. 6 (d).

In the embodiment shown in FIG. 6, the image is divided into seven sections corresponding to the ink keys in each ink well of the printing machine. Further, in this embodiment, Bk control points are present only in the second section from the right and in the second section from the left.

Referring again to FIG. 4, the image of the reference paper and the image of an actual print are read (steps S4 and S5).

Figure 7:
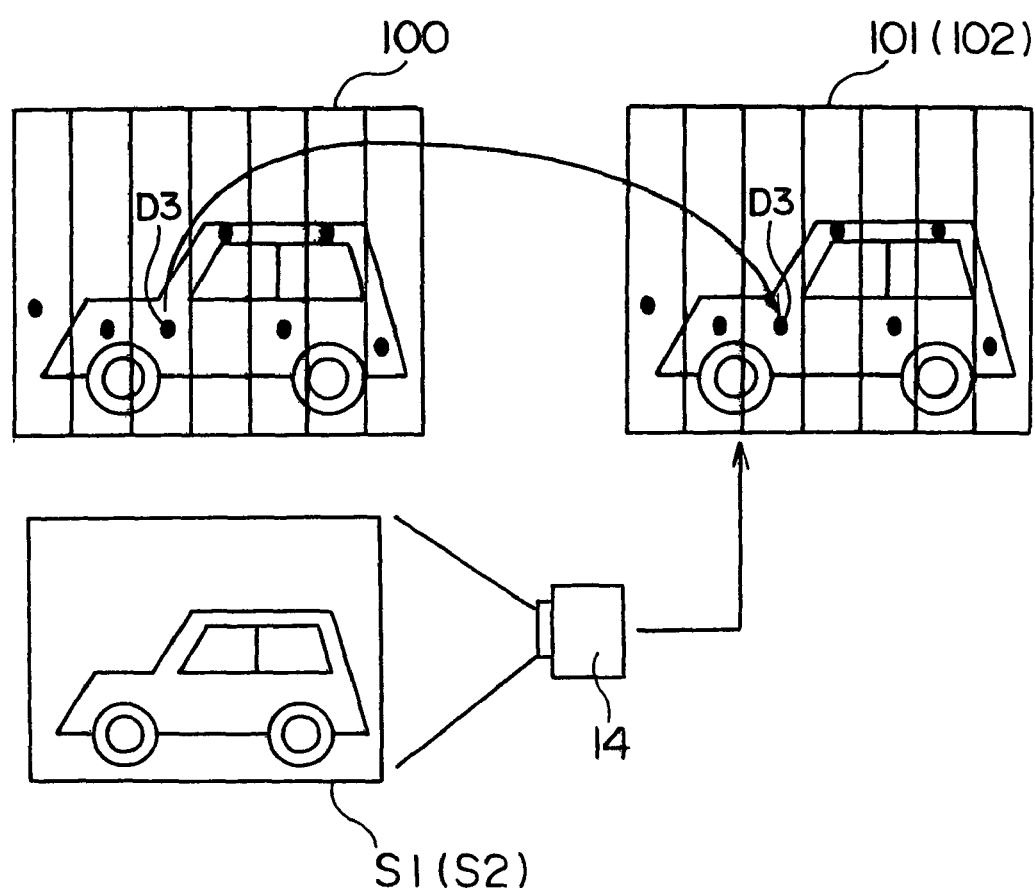
FIG. 7 is an explanatory view schematically showing a reading step.

Specifically, as shown in FIG. 7, the image of reference paper S1 is first read by the image pickup unit 14. The RGB values and positions of the representative color, the RGB values and positions of the gray control color and the RGB values and positions of the Bk control color are stored in the first image memory 24 shown in FIG. 3. At this time, as shown in FIG. 7, an image 100 acquired from the image data and an image 101 read by the image pickup unit 14 are different from each other in the number of the pixels, resolution, margin and so on. It is therefore necessary to correlate the two images in order to obtain correctly the RGB values and positions of the representative color, the RGB values and positions of the gray control color and the RGB values and positions of the Bk control color. In this case, the images may be displayed on the control panel 15 for the operator to work with the images manually or carry out a pattern matching. An example of pattern matching techniques is disclosed in Japanese Patent Application No. 2002-205117 in the name of Assignee herein.

Next, as shown in FIG. 7, the image of actual print S2 is read by the image pickup unit 14. As in the case of the reference paper noted above, positions corresponding to the positions of the representative color, gray control color and Bk control color derived from the PPF data are determined. The RGB values and positions of the representative color, the RGB values and positions of the gray control color and the RGB values and positions of the Bk control color are stored in the second image memory 25 shown in FIG. 3. In this case also, as shown in FIG. 7, an image 100 acquired from the image data and an image 101 read by the image pickup unit 14 are different from each other in the number of the pixels, resolution, margin and so on. Thus, the images may be displayed on the control panel 15 for the operator to work with the images manually or carry out a pattern matching.

Figure 8:
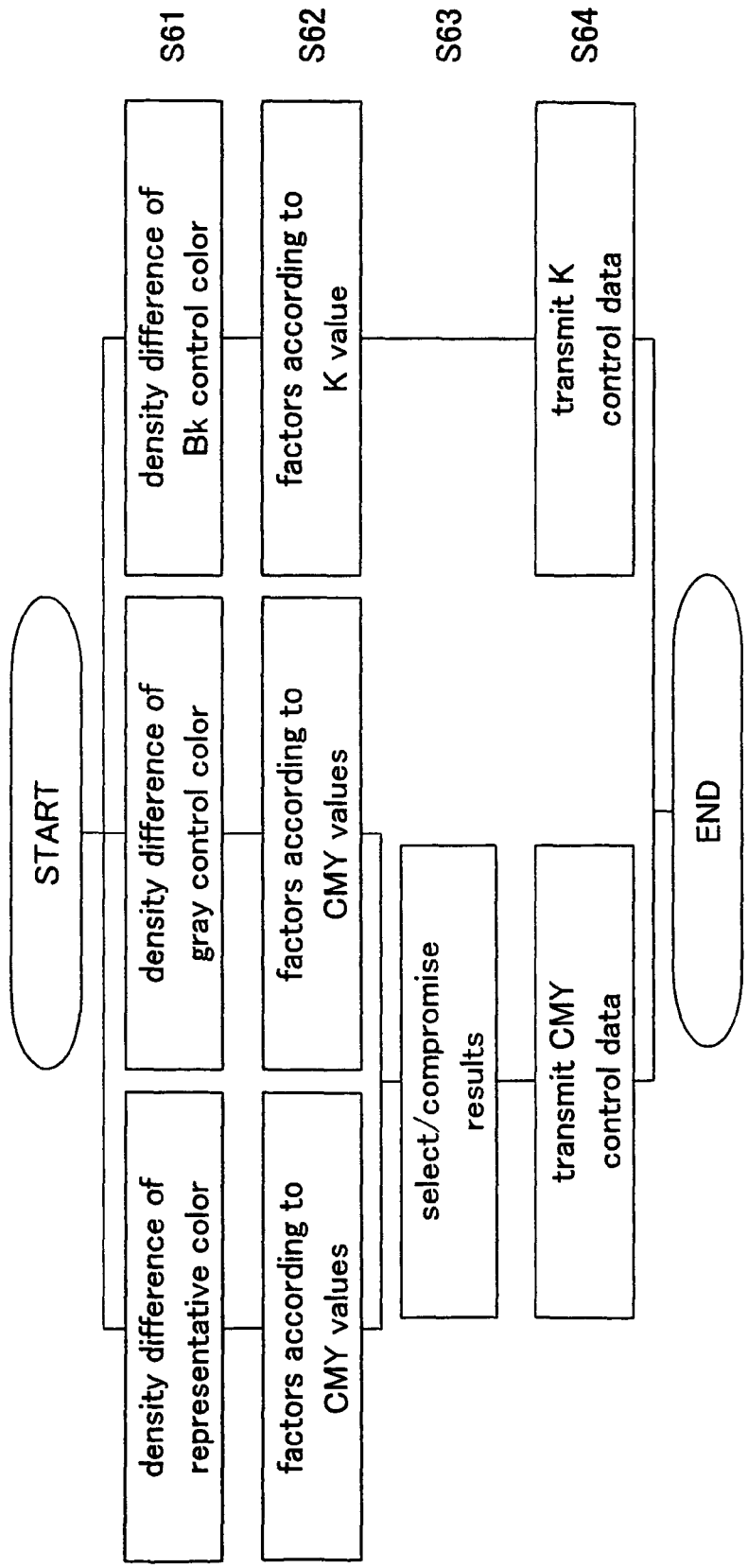
FIG. 8 is a flow chart of a calculating sequence.

Referring again to FIG. 4, after the image of the reference paper and the image of the actual print are read, a comparative calculation is carried out on the data obtained by reading the image of the reference paper and the image of the actual print, to create control data for controlling the ink feeding rates of the printing machine (step S6). This calculating step is executed by a subroutine shown in FIG. 8.

As a result of the steps of reading the image of the reference paper and the image of the actual print (steps S4 and S5), the first image memory 24 stores the data of the reference paper as partially shown in FIG. 9 (a), and the second image memory 25 stores the data of the print as partially shown in FIG. 9 (b). As shown in FIG. 6 (c), no Bk control color is selected for the first section. Thus, no data is present in the corresponding columns.

The CMYK values shown in FIGS. 9 (a) and 9 (b) are the PPF data fetched in the image data fetching step (step S11) shown in FIG. 5, which data are common to the reference paper and the print. On the other hand, the RGB values are the data obtained by reading the image of the reference paper and the image of the actual print. When a difference exceeding a fixed difference exists between the two groups of RGB values, proper prints are not being produced.

For this reason, a density difference is first calculated for each of the representative color, gray control color and Bk control color (step S61). Before this calculation, the RGB values shown in FIG. 9 are converted to CMYK values. This step is taken because the ink feeding rates are controlled more suitably by the CMYK values which are indexes linked to variations in ink quantity than by the RGB values representing color.

Next, the density differences of CMYK calculated are multiplied by factors selected according to dot percentages (step S62). That is, a larger density difference occurs in an area of large dot percentage than in an area of small dot percentage. The multiplication is carried out in order to secure exact information on the calculated density differences irrespective of dot percentage. At this time, the dot percentages are calculated by using the CMYK values shown in FIG. 9. However, the dot percentages may by calculated by using the RGB values shown in FIG. 9.

The above multiplication provides control data for controlling the ink feeding rates. At this time, the control data for controlling the feeding rate of black ink may be obtained by multiplying the density difference of Bk control color by a factor selected according to the K value. On the other hand, the control data for controlling the feeding rate of each of CMY inks is created by using one or both of a value obtained by multiplying the density difference of the representative color by a factor selected according to the C, M or Y value, and a value obtained by multiplying the density difference of the gray control color by a factor selected according to the C, M or Y value (step S63).

That is, when the representative color does not include one of CMY, only the value obtained by multiplying the density difference of the gray control color by a factor selected according to the C, M or Y value is used for the color not included or for all of CMY. In other cases, control data may be created by using only the value obtained by multiplying the density difference of the representative color by a factor selected according to the C, M or Y value, or by using a compromise in an appropriate ratio of the value obtained by multiplying the density difference of the representative color by a factor selected according to the C, M or Y value, and the value obtained by multiplying the density difference of the gray control color by a factor selected according to the C, M or Y value.

After obtaining the control data for controlling the feeding rates of CMY inks and the control data for controlling the feeding rate of K ink in the above steps, these data are transmitted to the control unit of the printing machine (step S64) to end the entire process.

In the embodiment described above, a representative color and the like are determined for each of the sections corresponding to the ink keys in each ink well of the printing machine. Instead, a representative color and the like of an entire image may be determined first, and priority may be given to a color close to the above color to determine a representative color and the like for each section.

In the above embodiment, a representative color and its positions are determined by using platemaking data or image data based on the platemaking data (PPF data). Instead, a representative color and its positions may be determined based on image data obtained by reading the reference paper. Further, instead of the image data obtained by reading the reference paper, platemaking data used for preparing the reference paper or image data based on the platemaking data may be used. In this case, this invention may be implemented also where image data such as PPF data is unavailable as where, for example, a platemaking operation is not digitized.

This invention may be embodied in other specific forms without departing from the spirit or essential attributes thereof and, accordingly, reference should be made to the appended claims, rather than to the foregoing specification, as indicating the scope of the invention.

This application claims priority benefit under 35 U.S.C. Section 119 of Japanese Patent Application No. 2002-210872 filed in the Japanese Patent Office on Jul. 19, 2002, the entire disclosure of which is incorporated herein by reference.

What is claimed is:

1. A print quality measuring method for comparing an image of reference paper and a printed image of a print corresponding to the image of the reference paper for controlling ink feeding rates of a printing machine, the method comprising:

a reading step for reading, by using an image pickup device, the image of the reference paper and the printed image of the print;

a representative color determining step for determining, from image data to be printed, a representative color characterizing the printed image of the print, and positions of the representative color; and a calculating step for carrying out, by using a calculating device including a CPU, a comparative calculation of color data in the positions of the representative color of the image of the reference paper and color data in the positions of the representative color of the printed image of the print, to create control data for controlling the ink feeding rates of the printing machine, wherein the representative color and the positions thereof are determined for respective rectangular sections on a printing paper corresponding to ink keys in each ink well of the printing machine, wherein said image data has three color components, said representative color determining step being executed to classify pixels in each of said sections corresponding to ink keys according to tones of each of the three color components, and determine said representative color and a position thereof from pixels included in a predetermined class interval, wherein said representative color determining step is executed to create a histogram with the tones of each of the three color components of each pixel in each of said sections, and select the representative color and the position thereof from pixels included in a class interval of maximum frequency in said histogram, and wherein the position of the representative color selected is a position having a maximum area formed by the pixels included in said class interval.

2. The print quality measuring method as defined in claim 1, wherein said image data for determining the representative color is one of platemaking data used at platemaking time and image data obtained by processing the platemaking data.

3. The print quality measuring method of claim 1, further comprising:

a gray control color determining step for determining, from the image data, a gray control color expressed in a substantially achromatic color and positions of the gray control color, wherein said calculating step is executed to create the control data for controlling the ink feeding rates of the printing machine, by using results of a comparative calculation of color data in the positions of said gray control color of the image of the reference paper and color data in the positions of said gray control color of the printed image of the print, as well as results of the comparative calculation of the color data in the positions of the representative color of the image of the reference paper and the color data in the positions of the representative color of the printed image of the print, wherein only the results of the comparative calculation of the color data in the positions of said gray control color of the image of the reference paper and the color data in the positions of said gray control color of the printed image of the print are used when the representative color is devoid of one of said three color components.

4. The print quality measuring method as defined in claim 3, wherein the control data for controlling the ink feeding rates of the printing machine is created by selectively using the results of the comparative calculation of the color data in the positions of the representative color of the image of the reference paper and the color data in the positions of the representative color of the printed image of the print, and the results of the comparative calculation of the color data in the positions of said gray control color of the image of the reference paper and the color data in the positions of said gray control color of the printed image of the print, or by using a compromise in an appropriate ratio of the results of the two comparative calculations.

5. A print quality measuring method for comparing an image obtained by reading an image of a print printed by using one of platemaking data and image data created from the platemaking data with said platemaking data or said image data, to create control data for controlling ink feeding rates of a printing machine, said method comprising:

a reading step for reading, by using an image pickup device, the image of the print;

a representative color determining step for determining a representative color characterizing the image of the print, and positions of the representative color, based on one of said platemaking data used at platemaking time and said image data created from the platemaking data; and a calculating step for carrying out, by using a calculating device including a CPU, a comparative calculation of color data in the positions of the representative color of the image of the print and the representative color, to create the control data for controlling the ink feeding rates of the printing machine, wherein the representative color and the positions thereof are determined for respective rectangular sections on a printing paper corresponding to ink keys in each ink well of the printing machine, wherein each of said platemaking data used at platemaking time and said image data created from the platemaking data has three color components, said representative color determining step being executed to classify pixels in each of said sections corresponding to ink keys, and determine the representative color and a position thereof from pixels included in a predetermined class interval, wherein said representative color determining step is executed to create a histogram with tones of each of the three color components of each pixel in each of said sections, and select the representative color and the position thereof from pixels included in a class interval of maximum frequency in said histogram, and wherein the position of the representative color selected is a position having a maximum area formed by the pixels included in said class interval.

6. The print quality measuring method of claim 5, further comprising:

a gray control color determining step for determining a gray control color expressed in a substantially achromatic color and positions of the gray control color, based on one of said platemaking data used at platemaking time and said image data created from the platemaking data, wherein said calculating step is executed to create the control data for controlling the ink feeding rates of the printing machine, by using results of a comparative calculation of color data in the positions of said gray control color of image data obtained by reading the image of the print and said gray control color, as well as results of the comparative calculation of the color data in the positions of the representative color of the image of the print and the representative color, and wherein only the results of the comparative calculation of the color data in the positions of said gray control color of the image data obtained by reading the image of the print and said gray control color are used when the representative color is devoid of one of said three color components.

7. The print quality measuring method as defined in claim 6, wherein the control data for controlling the ink feeding rates of the printing machine is created by selectively using the results of the comparative calculation of the color data in the positions of the representative color of the image data obtained by reading the image of the print and the representative color, and the results of the comparative calculation of the color data in the positions of said gray control color of the image data obtained by reading the image of the print and said gray control color, or by using a compromise in an appropriate ratio of the results of the two comparative calculations.

8. A print quality measuring apparatus for comparing an image of reference paper and a printed image of a print corresponding to the image of the reference paper for controlling ink feeding rates of a printing machine, said apparatus comprising:

reading means for reading the image of the reference paper and the printed image of the print;

representative color determining means for determining, from image data to be printed, a representative color characterizing the printed image of the print, and positions of the representative color; and calculating means for carrying out a comparative calculation of color data in the positions of the representative color of the image of the reference paper and color data in the positions of the representative color of the printed image of the print, to create control data for controlling the ink feeding rates of the printing machine, wherein the representative color and the positions thereof are determined for respective rectangular sections on a printing paper corresponding to ink keys in each ink well of the printing machine, wherein said image data has three color components, said representative color determining means being arranged to classify pixels in each of said sections corresponding to ink keys, and determine the representative color and a position thereof from pixels included in a predetermined class interval, wherein said representative color determining means is arranged to create a histogram with tones of each of the three color components of each pixel in each of said sections, and select the representative color and the position thereof from pixels included in a class interval of maximum frequency in said histogram, and wherein the position of the representative color selected is a position having a maximum area formed by the pixels included in said class interval.

9. The print quality measuring apparatus as defined in claim 8, wherein said image data to be printed for determining the representative color is one of platemaking data used at platemaking time and image data obtained by processing the platemaking data.

10. The print quality measuring apparatus as defined in claim 8, further comprising:

gray control color determining means for determining, from the image data, a gray control color expressed in a substantially achromatic color and positions of the gray control color;

wherein said calculating means is arranged to create the control data for controlling the ink feeding rates of the printing machine, by using results of a comparative calculation of color data in the positions of said gray control color of the image of the reference paper and color data in the positions of said gray control color of the printed image of the print, as well as results of the comparative calculation of the color data in the positions of the representative color of the image of the reference paper and the color data in the positions of the representative color of the printed image of the print, and wherein only the results of the comparative calculation of the color data in the positions of said gray control color of the image of the reference paper and the color data in the positions of said gray control color of the printed image of the print are used when the representative color is devoid of one of said three color components.

11. The print quality measuring apparatus as defined in claim 10, wherein the control data for controlling the ink feeding rates of the printing machine is created by selectively using the results of the comparative calculation of the color data in the positions of the representative color of the image of the reference paper and the color data in the positions of the representative color of the printed image of the print, and the results of the comparative calculation of the color data in the positions of said gray control color of the image of the reference paper and the color data in the positions of said gray control color of the printed image of the print, or by using a compromise in an appropriate ratio of the results of the two comparative calculations.

12. A print quality measuring apparatus for comparing an image obtained by reading an image of a print printed by using one of platemaking data and image data with said platemaking data or said image data, to create control data for controlling ink feeding rates of a printing machine, said apparatus comprising:

reading means for reading the image of the print;

representative color determining means for determining a representative color characterizing the image of the print, and positions of the representative color, based on one of said platemaking data used at platemaking time and said image data created from the platemaking data; and calculating means for carrying out a comparative calculation of color data in the positions of the representative color of the image of the print and the representative color, to create the control data for controlling the ink feeding rates of the printing machine, wherein the representative color and the positions thereof are determined for respective rectangular sections on a printing paper corresponding to ink keys in each ink well of the printing machine, wherein each of said platemaking data used at platemaking time and said image data created from the platemaking data has three color components, said representative color determining means being arranged to classify pixels in each of said sections corresponding to ink keys, and determine the representative color and a position thereof from pixels included in a predetermined class interval, wherein said representative color determining means is arranged to create a histogram with tones of each of the three color components of each pixel in each of said sections, and select the representative color and the position thereof from pixels included in a class interval of maximum frequency in said histogram, and wherein the position of the representative color selected is a position having a maximum area formed by the pixels included in said class interval.

13. The print quality measuring apparatus of claim 12, further comprising:

gray control color determining means for determining a gray control color expressed in a substantially achromatic color and positions of the gray control color, based on one of said platemaking data used at platemaking time and said image data created from the platemaking data;

wherein said calculating means is arranged to create the control data for controlling the ink feeding rates of the printing machine, by using results of a comparative calculation of color data in the positions of said gray control color of image data obtained by reading the image of the print and said gray control color, as well as results of the comparative calculation of the color data in the positions of the representative color of the image of the print and the representative color, and wherein only the results of the comparative calculation of the color data in the positions of said gray control color of the image data obtained by reading the image of the print and said gray control color are used when the representative color is devoid of one of said three color components.

14. The print quality measuring apparatus as defined in claim 13, wherein the control data for controlling the ink feeding rates of the printing machine is created by selectively using the results of the comparative calculation of the color data in the positions of the representative color of the image data obtained by reading the image of the print and the representative color, and the results of the comparative calculation of the color data in the positions of said gray control color of the image data obtained by reading the image of the print and said gray control color, or by using a compromise in an appropriate ratio of the results of the two comparative calculations.

* * * * *